United States Patent
Chiu

(10) Patent No.: US 11,724,657 B2
(45) Date of Patent: Aug. 15, 2023

(54) AUTOMOTIVE ELECTRONIC SYSTEM AND CONTROL METHOD THEREOF

(71) Applicant: Quanta Computer Inc., Taoyuan (TW)

(72) Inventor: Pin-Chi Chiu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 167 days.

(21) Appl. No.: 17/351,426

(22) Filed: Jun. 18, 2021

(65) Prior Publication Data
US 2022/0348153 A1    Nov. 3, 2022

(30) Foreign Application Priority Data
May 3, 2021    (TW) .................................. 110115836

(51) Int. Cl.
*B60R 16/023*    (2006.01)
*B60W 50/14*    (2020.01)

(52) U.S. Cl.
CPC ........... *B60R 16/023* (2013.01); *B60W 50/14* (2013.01); *B60W 2050/146* (2013.01); *B60W 2420/403* (2013.01)

(58) Field of Classification Search
CPC ........... B60W 50/14; B60W 2050/146; B60W 2420/403
See application file for complete search history.

(56) References Cited

U.S. PATENT DOCUMENTS

2019/0258251 A1    8/2019    Ditty et al.

OTHER PUBLICATIONS

English translation of Chinese Language Office Action Oct. 14, 2021, TW110115836. (Year: 2021).*
Chinese language office action dated Oct. 14, 2021, issued in application No. TW 110115836.

* cited by examiner

*Primary Examiner* — Nabil H Syed
*Assistant Examiner* — Cal J Eustaquio
(74) *Attorney, Agent, or Firm* — McClure, Qualey & Rodack, LLP

(57) ABSTRACT

An automotive electronic system includes a detection element, a first cable, and a control device. The detection element includes a first serializer. The first serializer supports a first signal mode. The control device includes a processor and a first deserializer. The processor generates a first control signal. The first deserializer is coupled through the first cable to the first serializer, and is switchable between a plurality of operation modes according to the first control mode. Responsive to the detection element, the first deserializer selects a first specific mode among the operation modes, and the first specific mode matches with the first signal mode.

9 Claims, 5 Drawing Sheets

AUTOMOTIVE ELECTRONIC SYSTEM AND CONTROL METHOD THEREOF

CROSS REFERENCE TO RELATED APPLICATIONS

This application claims priority of Taiwan Patent Application No. 110115836 filed on May 3, 2021, the entirety of which is incorporated by reference herein.

BACKGROUND OF THE INVENTION

Field of the Invention

The disclosure generally relates to an automotive electronic system, and more particularly, relates to an automotive electronic system for dynamically switching operation modes and a control method thereof.

Description of the Related Art

In traditional automotive electronic systems, signal modes of various peripheral components are not the same, and this often results in obstacles to communication with a control device. As a result, the overall complexity and the manufacturing cost are both increased. Accordingly, there is a need to propose a novel solution for solving the problems of the prior art.

BRIEF SUMMARY OF THE INVENTION

In an exemplary embodiment, the disclosure is directed to an automotive electronic system that includes a detection element, a first cable, and a control device. The detection element includes a first serializer. The first serializer supports a first signal mode. The control device includes a processor and a first deserializer. The processor generates a first control signal. The first deserializer is coupled through the first cable to the first serializer, and is switchable between a plurality of operation modes according to the first control mode. Responsive to the detection element, the first deserializer selects a first specific mode among the operation modes. The first specific mode matches with the first signal mode.

In some embodiments, the detection element is a camera element.

In some embodiments, the control device is an ADAS (Advanced Driver Assistance System).

In some embodiments, the operation modes include an I2C (Inter-Integrated Circuit) mode, an SPI (Serial Peripheral Interface) mode, and a UART (Universal Asynchronous Receiver/Transmitter) mode.

In some embodiments, the first control signal includes a first initial signal and a first switch signal. Any of the operation modes is switched according to the first switch signal. The first deserializer is initialized and preset according to the first initial signal.

In some embodiments, when switching between the operation modes, the first deserializer outputs a first test signal to the first serializer and checks whether to receive a first responsive signal within a predetermined time period.

In some embodiments, the automotive electronic system further includes an output element and a second cable. The output element includes a second deserializer. The second deserializer supports a second signal mode.

In some embodiments, the output element is a display element.

In some embodiments, the processor further generates a second control signal. The control device further includes a second serializer coupled through the second cable to the second deserializer. The second serializer is switchable between the operation modes according to the second control signal. Responsive to the output element, the second serializer selects a second specific mode among the operation modes. The second specific mode matches with the second signal mode.

In another exemplary embodiment, the disclosure is directed to a control method for an automotive electronic system. The method includes the steps of: providing a detection element, a first cable, and a control device, wherein the detection element includes a first serializer, the control device includes a first deserializer, and the first deserializer is coupled through the first cable to the first serializer; switching between a plurality of operation modes by the first deserializer; and responsive to the detection element, selecting a first specific mode among the operation modes by the first deserializer, wherein the first specific mode matches with a first signal mode supported by the first serializer.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
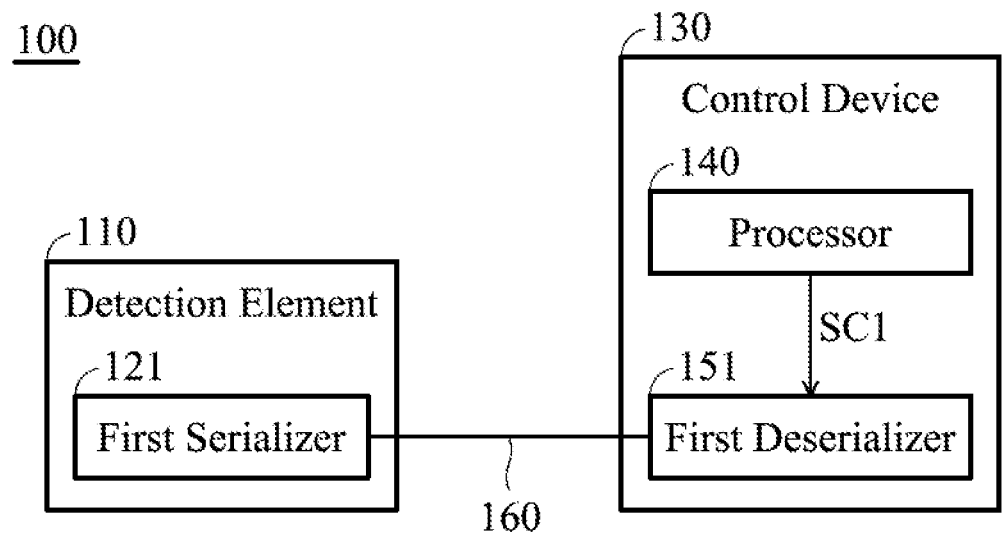
FIG. 1 is a diagram of an automotive electronic system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an automotive electronic system 100 according to an embodiment of the invention. As shown in FIG. 1, the automotive electronic system 100 at least includes a detection element 110, a control device 130, and a first cable 160. For example, the control device 130 may be an ADAS (Advanced Driver Assistance System), which may be implemented with a central control computer of a vehicle, but it is not limited thereto. It should be understood that the automotive electronic system 100 may further include other components, such as a display device, a speaker, a touch control module, a power supply module, and/or a housing, although they are not displayed in FIG. 1.

The detection element 110 can receive any information relative to the vehicle. For example, the detection element 110 may be a camera element, an antenna element, a recording element, or a reception element of other types. The detection element 110 includes a first serializer 121. The first serializer 121 can support a first signal mode. For example, the so-called "mode" may also mean "control interface". In some embodiments, the aforementioned first signal mode is one of an I2C (Inter-Integrated Circuit) mode, an SPI (Serial Peripheral Interface) mode, and a UART (Universal Asynchronous Receiver/Transmitter) mode. It should be noted that the invention is not limited thereto. In alternative embodiments, the aforementioned first signal mode may be another signal mode applying to automotive communication.

The control device 130 includes a processor 140 and a first deserializer 151. For example, the processor 140 may be an SoC (System on a Chip). The processor 140 generates a first control signal SC1 for controlling the operations of the first deserializer 151. The first deserializer 151 of the control device 130 is coupled through the first cable 160 to the first serializer 121 of the detection element 110. The first cable 160 is considered as an all-in-one serial link, and its type is not limited in the invention. It should be noted that the first serializer 121 and the first deserializer 151 are called together as a "Serdes" combination. Generally, the information received by the detection element 110 is transmitted by the first serializer 121 to the first deserializer 151 of the control device 130.

Figure 2:
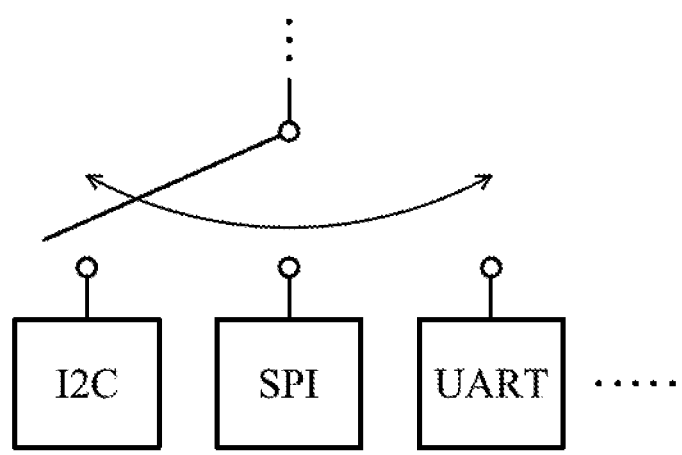
FIG. 2 is a diagram of a control device switching between different operation modes according to an embodiment of the invention.

FIG. 2 is a diagram of the control device 130 switching between different operation modes according to an embodiment of the invention. It can be implemented with software, hardware, or a combination thereof. In order to successfully establish communication between the first serializer 121 and the first deserializer 151, initially, the first deserializer 151 is switchable between a plurality of operation modes according to the first control signal SC1. In some embodiments, the aforementioned operation modes include an I2C mode, an SPI mode, and a UART mode. It should be noted that the invention is not limited thereto. In alternative embodiments, the aforementioned operation mode may be another signal mode applying to automotive communication. Responsive to the detection element 110, the first deserializer 151 can finally select a first specific mode among the operation modes. The first specific mode can match with the first signal mode of the first serializer 121.

Since the detection element 110 comes from various manufacturers, it may support only one of a plurality of modes. With the design of the present invention, the control device 130 of the automotive electronic system 100 can dynamically select a specific operation mode that is exactly compatible with the detection element 110. It not only simplifies the overall complexity, but also reduces the total manufacturing cost of the automotive electronic system 100. The following embodiments will introduce the detailed structure and operation of the automotive electronic system 100. It should be understood that these figures and descriptions are merely exemplary, rather than limitations of the invention.

Figure 3:
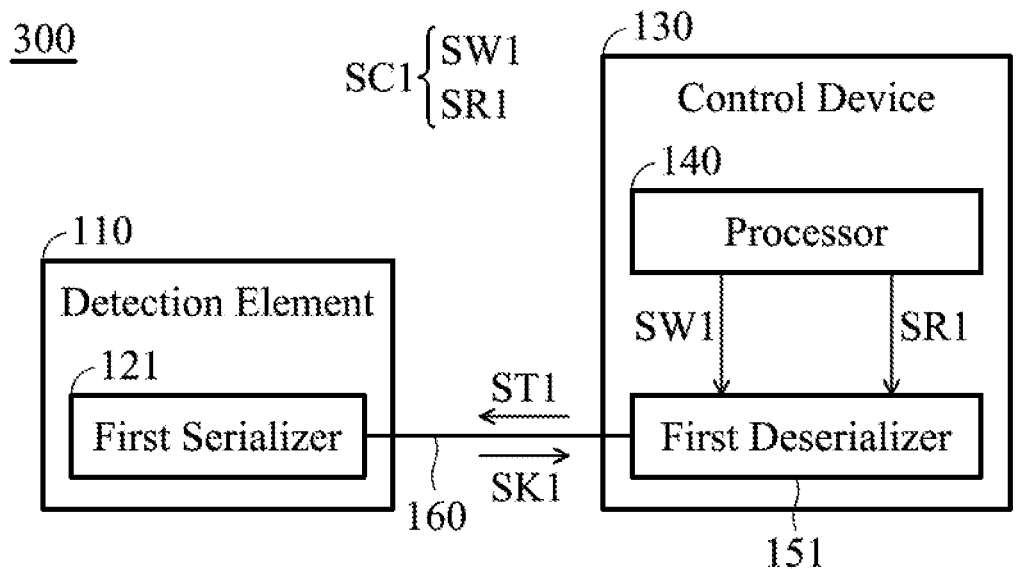
FIG. 3 is a diagram of an automotive electronic system according to an embodiment of the invention.

FIG. 3 is a diagram of an automotive electronic system 300 according to an embodiment of the invention. FIG. 3 is similar to FIG. 1. In the embodiment of FIG. 3, the first control signal SC1 includes a first initial signal SR1 and a first switch signal SW1. The first deserializer 151 can switch to any one of the aforementioned operation modes according to the first switch signal SW1. Next, the first deserializer 151 can be initialized and preset (reset) according to the first initial signal SR1, so as to enter the selected operation mode formally.

In some embodiments, the processor 140 controls the first deserializer 151 to switch to the aforementioned operation modes one after another, and then select the best operation mode in response to the detection element 110. It is assumes that the first signal mode supported by the first serializer 121 of the detection element 110 is the UART mode (in fact, the first signal mode is adjustable according to different requirements). In the beginning, the first deserializer 151 switches to the I2C mode according to the first control signal SC1, and outputs a first test signal ST1 in the I2C mode to the first serializer 121. Since the I2C mode does not match with the UART mode, the first deserializer 151 cannot receive a first responsive signal SK1 from the first serializer 121 within a predetermined time period (e.g., 1 second) (i.e., no response from the first serializer 121). Next, the first deserializer 151 switches to the SPI mode according to the first control signal SC1, and outputs a first test signal ST1 in the SP1 mode to the first serializer 121. Since the SP1 mode still does not match with the UART mode, the first deserializer 151 cannot receive the first responsive signal SK1 from the first serializer 121 within the predetermined time period. Finally, the first deserializer 151 switches to the UART mode according to the first control signal SC1, and outputs a first test signal ST1 in the UART mode to the first serializer 121. Since the UART mode matches with the UART mode, the first deserializer 151 can receive the first responsive signal SK1 from the first serializer 121 within the predetermined time period. In the example, responsive to the detection element 110, the first specific mode which is finally selected by the first deserializer 151 is the UART mode (matching with the first signal mode supported by the first serializer 121). Other features of the automotive electronic system 300 of FIG. 3 are similar to those of the automotive electronic system 100 of FIG. 1. Thus, the two embodiments can achieve similar levels of performance.

Figure 4:
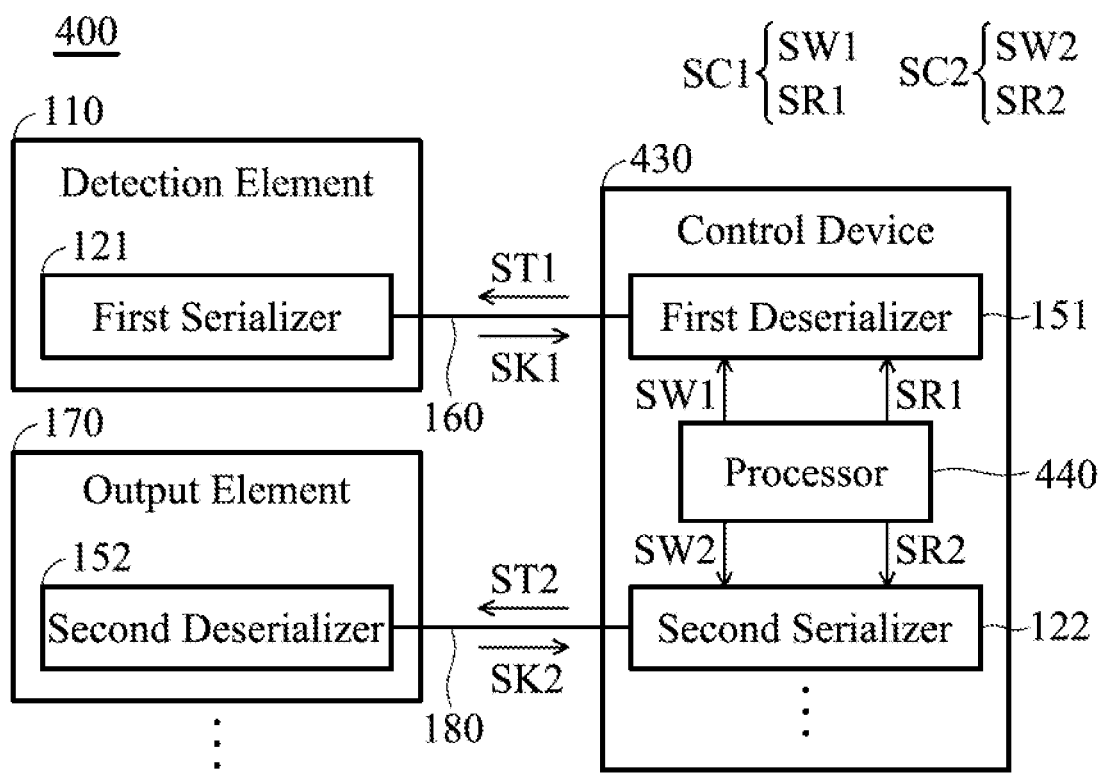
FIG. 4 is a diagram of an automotive electronic system according to an embodiment of the invention.

FIG. 4 is a diagram of an automotive electronic system 400 according to an embodiment of the invention. FIG. 4 is similar to FIG. 3. In the embodiment of FIG. 4, the automotive electronic system 400 further includes an output element 170 and a second cable 180, and a control device 430 of the automotive electronic system 400 further includes a second serializer 122. The output element 170 can output any information relative to the vehicle. For example, the output element 170 may be a display element, an antenna element, a speaker element, or a showing element of other types. The output element 170 includes a second deserializer 152. The second deserializer 152 can support a second signal mode. In some embodiments, the aforementioned second signal mode is one of an I2C mode, an SPI mode, and a UART mode. It should be noted that the invention is not limited thereto. In alternative embodiments, the aforementioned second signal mode may be another signal mode applying to automotive communication.

A processor 440 of the control device 430 further generates a second control signal SC2 for controlling the operations of the second serializer 122. The second serializer 122 of the control device 430 is coupled through the second cable 180 to the second deserializer 152 of the output element 170. The second cable 180 is considered as an all-in-one serial link, and its type is not limited in the invention. Similarly, the second serializer 122 and the second deserializer 152 are called together as a "Serdes" combination. Generally, the information generated by the processor 440 (e.g., image and audio data) is transmitted by the second serializer 122 to the second deserializer 152 of the output element 170. In order to successfully establish communication between the second serializer 122 and the second deserializer 152, initially, the second serializer 122 is switchable between a plurality of operation modes according to the second control signal SC2. In some embodiments, the aforementioned operation modes include an I2C mode, an SPI mode, and a UART mode. It should be noted that the invention is not limited thereto. In alternative embodiments, the aforementioned operation mode may be another signal mode applying to automotive communication. Responsive to the output element 170, the second serializer 122 can finally select a second specific mode among the operation modes. The second specific mode can match with the second signal mode of the second deserializer 152.

In some embodiments, the second control signal SC2 includes a second initial signal SR2 and a second switch signal SW2. The second serializer 122 can switch to any one of the aforementioned operation modes according to the second switch signal SW2. Next, the second serializer 122 can be initialized and preset (reset) according to the second initial signal SR2, so as to enter the selected operation mode formally.

In some embodiments, the processor 440 controls the second serializer 122 to switch to the aforementioned operation modes one after another, and then select the best operation mode in response to the output element 170. It is assumes that the second signal mode supported by the second deserializer 152 of the output element 170 is the SPI mode (in fact, the second signal mode is adjustable according to different requirements). In the beginning, the second serializer 122 switches to the I2C mode according to the second control signal SC2, and outputs a second test signal ST2 in the I2C mode to the second deserializer 152. Since the I2C mode does not match with the SPI mode, the second serializer 122 cannot receive a second responsive signal SK2 from the second deserializer 152 within a predetermined time period (e.g., 1 second) (i.e., no response from the second deserializer 152). Next, the second serializer 122 switches to the SPI mode according to the second control signal SC2, and outputs a second test signal ST2 in the SP1 mode to the second deserializer 152. Since the SPI mode matches with the SPI mode, the second serializer 122 can receive the second responsive signal SK2 from the second deserializer 152 within the predetermined time period. On the other hand, the second serializer 122 is not required to switch to the UART mode. In the example, responsive to the output element 170, the second specific mode which is finally selected by the second serializer 122 is the SPI mode (matching with the second signal mode supported by the second deserializer 152). Other features of the automotive electronic system 400 of FIG. 4 are similar to those of the automotive electronic system 300 of FIG. 3. Thus, the two embodiments can achieve similar levels of performance.

Figure 5A:
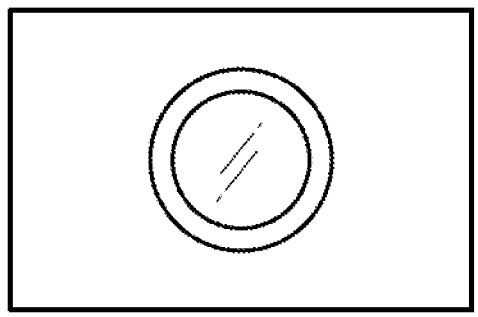
FIG. 5A is a diagram of a camera element according to an embodiment of the invention.
Figure 5B:
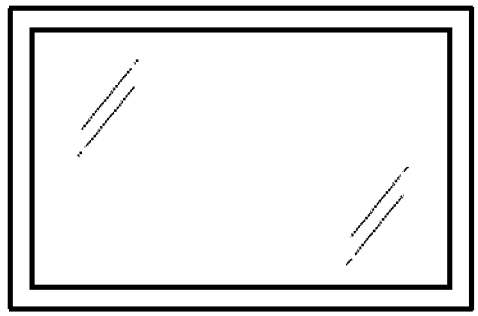
FIG. 5B is a diagram of a display element according to an embodiment of the invention.
Figure 6:
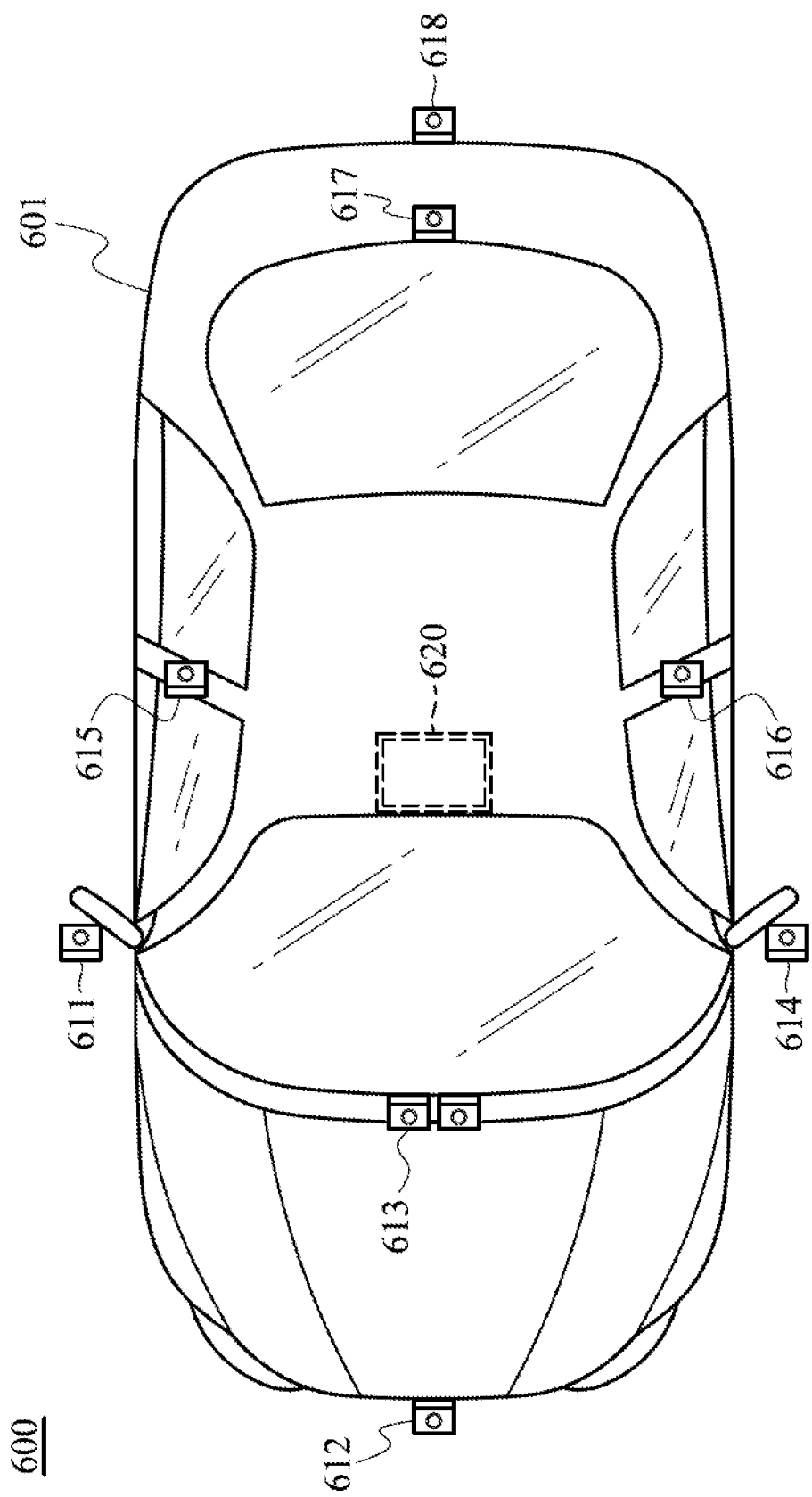
FIG. 6 is a diagram of arrangements of an automotive electronic system according to an embodiment of the invention.

FIG. 5A is a diagram of the camera element according to an embodiment of the invention. FIG. 5B is a diagram of the display element according to an embodiment of the invention. FIG. 5A and FIG. 5B describe possible appearances of the camera element and the display element. FIG. 6 is a diagram of arrangements of an automotive electronic system 600 according to an embodiment of the invention. According to different requirements, the automotive electronic system 600 may include a plurality of detection elements (or camera elements) 611, 612, 613, 614, 615, 616, 617 and 618 and an output element (or a display element) 620. The detection elements 611, 612, 613, 614, 615, 616, 617 and 618 may be disposed outside of a car body 601 so as to collect outer information. The output element 620 may be disposed inside of the car body 601 so as to provide information for the driver. It should be understood that the above arrangements are merely exemplary. As a matter of fact, the automotive electronic system 600 may include more or fewer detection element(s) and output element(s).

Figure 7:
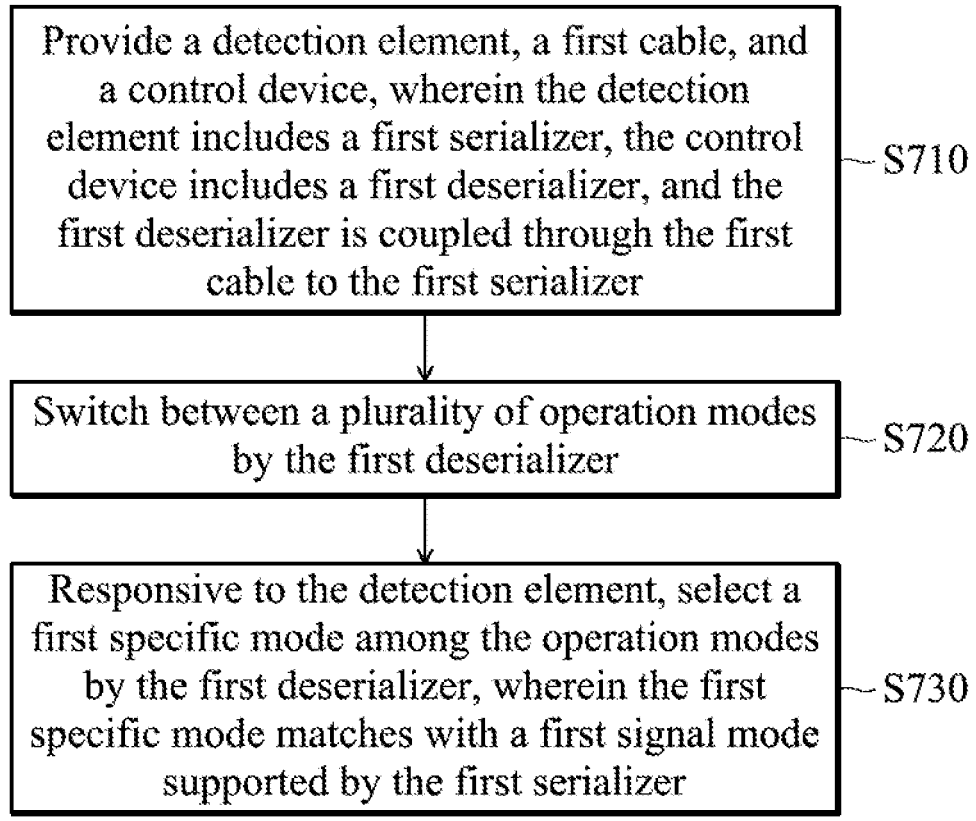
FIG. 7 is a flowchart of a control method for an automotive electronic system according to an embodiment of the invention.

FIG. 7 is a flowchart of a control method for an automotive electronic system according to an embodiment of the invention. In step S710, a detection element, a first cable, and a control device are provided. The detection element includes a first serializer. The control device includes a first deserializer. The first deserializer is coupled through the first cable to the first serializer. In step S720, a plurality of operation modes are switched between by the first deserializer. In step S730, responsive to the detection element, a first specific mode among the operation modes is finally selected by the first deserializer. The first specific mode matches with a first signal mode supported by the first serializer. It should be understood that the above steps are not required to be performed in order, and every feature of the embodiments of FIGS. 1 to 6 may be applied to the control method of FIG. 7.

The invention proposes a novel automotive electronic system. Compared to the conventional design, the invention has at least the advantages of reducing complexity and reducing manufacturing cost, and therefore it is suitable for application in a variety of smart vehicles.

Note that the above element parameters are not limitations of the invention. A designer can fine-tune these settings or values according to different requirements. It should be understood that the automotive electronic system and the control method of the invention are not limited to the configurations of FIGS. 1-7. The invention may merely include any one or more features of any one or more embodiments of FIGS. 1-7. In other words, not all of the features displayed in the figures should be implemented in the automotive electronic system and the control method of the invention.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automotive electronic system, comprising:
a detection element, comprising a first serializer, wherein the first serializer supports a first signal mode;
a first cable; and
a control device, comprising:
a processor, generating a first control signal; and
a first deserializer, coupled through the first cable to the first serializer, and switching between a plurality of operation modes according to the first control signal, wherein responsive to the detection element, the first deserializer selects a first specific mode among the operation modes, and the first specific mode matches with the first signal mode;
wherein when switching between the operation modes, the first deserializer outputs a first test signal to the first serializer and checks whether to receive a first responsive signal within a predetermined time period.

2. The automotive electronic system as claimed in claim 1, wherein the detection element is a camera element.

3. The automotive electronic system as claimed in claim 1, wherein the control device is an ADAS (Advanced Driver Assistance System).

4. The automotive electronic system as claimed in claim 1, wherein the operation modes comprise an I2C (Inter-Integrated Circuit) mode, an SPI (Serial Peripheral Interface) mode, and a UART (Universal Asynchronous Receiver/Transmitter) mode.

5. The automotive electronic system as claimed in claim 1, wherein the first control signal comprises a first initial signal and a first switch signal, any of the operation modes is switched according to the first switch signal, and the first deserializer is initialized and preset according to the first initial signal.

6. The automotive electronic system as claimed in claim 1, further comprising:
an output element, comprising a second deserializer, wherein the second deserializer supports a second signal mode; and
a second cable.

7. The automotive electronic system as claimed in claim 6, wherein the output element is a display element.

8. The automotive electronic system as claimed in claim 6, wherein the processor further generates a second control signal, and the control device further comprises:
a second serializer, coupled through the second cable to the second deserializer, and switching between the operation modes according to the second control signal, wherein responsive to the output element, the second serializer selects a second specific mode among the operation modes, and the second specific mode matches with the second signal mode.

9. A control method for an automotive electronic system, comprising the steps of:
providing a detection element, a first cable, and a control device, wherein the detection element comprises a first serializer, the control device comprises a first deserializer, and the first deserializer is coupled through the first cable to the first serializer;
switching between a plurality of operation modes by the first deserializer;
responsive to the detection element, selecting a first specific mode among the operation modes by the first deserializer, wherein the first specific mode matches with a first signal mode supported by the first serializer; and
when switching between the operation modes, outputting a first test signal to the first serializer and checking whether to receive a first responsive signal within a predetermined time period by the first deserializer.

* * * * *